US008135116B2

(12) United States Patent  
Bowden

(10) Patent No.: US 8,135,116 B2
(45) Date of Patent: Mar. 13, 2012

(54) METHODS, SYSTEMS, AND COMPUTER PROGRAM PRODUCTS FOR MANAGING TRAFFIC CONGESTION IN A NETWORK THROUGH DETECTION OF A SOURCE OF EXCESSIVE CALL VOLUME

(75) Inventor: Mark Bowden, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1148 days.

(21) Appl. No.: 11/942,978

(22) Filed: Nov. 20, 2007

(65) Prior Publication Data

US 2009/0129560 A1 May 21, 2009

(51) Int. Cl.
*H04M 15/00* (2006.01)
*H04M 3/22* (2006.01)

(52) U.S. Cl. .................. 379/112.04; 370/230; 370/232; 370/235; 370/395.21; 370/428; 379/32.01; 379/88.16; 379/133; 379/201.02; 379/221.01; 705/7.13; 709/226; 709/229

(58) Field of Classification Search .................. 370/232, 370/235, 352, 356, 385, 389, 395.2, 410, 370/428, 230, 231, 395.21; 379/32.01, 88.16, 379/88.18, 112.04, 133, 134, 201.02, 221.01; 705/713; 709/226, 229
See application file for complete search history.

(56) References Cited

U.S. PATENT DOCUMENTS

| 4,106,583 | A | | 8/1978 | Nemeth |
|---|---|---|---|---|
| 4,611,096 | A | * | 9/1986 | Asmuth et al. ........... 379/201.02 |
| 4,650,028 | A | | 3/1987 | Eastman et al. |
| 4,914,807 | A | | 4/1990 | Cook |
| 4,922,789 | A | | 5/1990 | Aono et al. |
| 5,037,362 | A | | 8/1991 | Teraoka et al. |
| 5,045,038 | A | | 9/1991 | Sherlock |
| 5,055,095 | A | | 10/1991 | Osenbaugh et al. |
| RE33,742 | E | | 11/1991 | Blessing et al. |
| 5,115,429 | A | * | 5/1992 | Hluchyj et al. ............... 370/231 |
| 5,133,696 | A | | 7/1992 | Kobayashi |
| 5,183,446 | A | | 2/1993 | Hughes |
| 5,276,677 | A | * | 1/1994 | Ramamurthy et al. ....... 370/232 |
| 5,488,609 | A | * | 1/1996 | Hluchyj et al. ............... 370/232 |
| 5,556,344 | A | | 9/1996 | Fox |
| 5,631,948 | A | * | 5/1997 | Bartholomew et al. ..... 379/88.18 |
| 5,646,943 | A | * | 7/1997 | Elwalid ......................... 370/230 |
| 5,699,888 | A | | 12/1997 | Showalter |
| 5,741,199 | A | | 4/1998 | Tanser et al. |
| 5,828,729 | A | * | 10/1998 | Clermont et al. .......... 379/32.01 |
| 5,828,731 | A | * | 10/1998 | Szlam et al. ............... 379/88.16 |
| 6,137,806 | A | * | 10/2000 | Martinez ....................... 370/428 |
| 6,144,639 | A | * | 11/2000 | Zhao et al. .................... 370/235 |
| 6,168,545 | B1 | | 1/2001 | Lowell |
| 6,192,406 | B1 | * | 2/2001 | Ma et al. ....................... 709/226 |
| 6,283,889 | B1 | | 9/2001 | Bordner |
| 6,293,891 | B1 | | 9/2001 | Irwin et al. |
| 6,333,931 | B1 | * | 12/2001 | LaPier et al. .................. 370/385 |
| 6,342,022 | B1 | | 1/2002 | Sturm |

(Continued)

*Primary Examiner* — Gerald Gauthier

(74) *Attorney, Agent, or Firm* — Myers Bigel Sibley & Sajovec, P.A.

(57) ABSTRACT

A communication network that includes a signaling system seven (SS7) network is operated by associating call release messages, which are indicative of call failures in the communication network, with an originating point code (OPC) and/or a calling number. The rate at which calls originating from the originating point code and/or the calling number are admitted to the network may be adjusted based on the association between the call release messages and the originating point code and/or the calling number.

11 Claims, 8 Drawing Sheets

U.S. PATENT DOCUMENTS

| | | |
|---|---|---|
| 6,354,979 B1 | 3/2002 | Lohr |
| 6,379,277 B1 | 4/2002 | Victoria et al. |
| 6,491,126 B1 | 12/2002 | Robison et al. |
| 6,529,594 B1 * | 3/2003 | Brockman et al. ............ 379/133 |
| 6,605,015 B1 | 8/2003 | Kinsley et al. |
| 6,659,208 B2 | 12/2003 | Gaffney et al. |
| 6,698,313 B2 | 3/2004 | Gaffney et al. |
| 6,724,765 B1 * | 4/2004 | Howell .......................... 370/410 |
| 6,785,282 B1 * | 8/2004 | Gardner ..................... 370/395.2 |
| 6,789,657 B2 | 9/2004 | Schrand et al. |
| 6,873,617 B1 * | 3/2005 | Karras ......................... 370/389 |
| 6,902,506 B2 | 6/2005 | Schrand |
| 7,027,574 B2 * | 4/2006 | Nolting ......................... 379/134 |
| 7,224,686 B1 * | 5/2007 | Doskow et al. ............... 370/352 |
| 7,254,130 B1 * | 8/2007 | Bale et al. ..................... 370/356 |
| 7,310,349 B2 * | 12/2007 | Beshai .......................... 370/428 |
| 7,372,811 B1 * | 5/2008 | Ahn et al. ..................... 370/231 |
| 7,447,645 B2 * | 11/2008 | Spragle et al. ................ 705/7.13 |
| 7,647,411 B1 * | 1/2010 | Schiavone et al. ............ 709/229 |
| 7,672,309 B1 * | 3/2010 | Jones ....................... 370/395.21 |
| 7,817,789 B2 * | 10/2010 | Ferguson et al. ........ 379/112.04 |
| 7,961,616 B2 * | 6/2011 | Jain et al. ..................... 370/235 |
| 2004/0160896 A1 * | 8/2004 | Luna et al. .................... 370/235 |
| 2008/0198998 A1 * | 8/2008 | Aleynikov ............... 379/221.01 |
| 2009/0129560 A1 * | 5/2009 | Bowden ..................... 379/32.01 |

* cited by examiner

METHODS, SYSTEMS, AND COMPUTER PROGRAM PRODUCTS FOR MANAGING TRAFFIC CONGESTION IN A NETWORK THROUGH DETECTION OF A SOURCE OF EXCESSIVE CALL VOLUME

BACKGROUND OF THE INVENTION

The present invention relates to communication networks, and, more particularly, to communication networks that use common channel signaling, such as Signaling System 7 (SS7).

Auto dialing systems have recently become more widespread in telecommunication networks. Auto dialing systems may be used by telemarketers, political campaigns, emergency broadcasters, survey takers, and other organizations to make large numbers of calls to relatively narrow geographic areas. Unfortunately, such a large call volume destined for a relatively concentrated number of phone numbers can result in congestion or even a "denial of service" condition on a shared trunk group that connects two Service Switching Points (SSPs), such as a tandem switching office and subtending end office switches.

SUMMARY

According to some embodiments of the present invention, a communication network that includes a signaling system seven (SS7) network is operated by associating call release messages, which are indicative of call failures in the communication network, with an originating point code (OPC) and/or a calling number. The rate at which calls originating from the originating point code and/or the calling number are admitted to the network may be adjusted based on the association between the call release messages and the originating point code and/or the calling number.

In other embodiments of the present invention, the call release messages include those with cause codes of no circuit available and/or unallocated number.

In still other embodiments of the present invention, associating the call release messages includes determining a count of no circuit available messages during a measurement interval and/or determining a count of unallocated number messages during the measurement interval.

In still other embodiments of the present invention, associating the call release messages includes determining if the count of no circuit available messages exceeds a no circuit available threshold and/or determining if the count of unallocated number messages exceeds an unallocated number threshold.

In still other embodiments of the present invention, associating the call release messages further includes determining at a signal transfer point (STP) network element a count of Initial Address Messages (IAM) from the OPC to a destination point code (DPC) for the measurement interval and/or determining at the STP a count of IAMs from a calling number to the DPC for the measurement interval.

In still other embodiments of the present invention, associating the call release messages further includes determining an average count of IAMs from the OPC to the DPC over N previous measurement intervals and/or determining an average count of IAMs from a calling number to the DPC over the N previous measurement intervals.

In still other embodiments of the present invention, adjusting the rate at which calls originate from the OPC and/or the calling number are admitted to the network includes performing the following operations: First, a count of abnormal release messages sent by a local exchange tandem is determined to exceed a predetermined threshold for no circuit available and/or unallocated number release messages. Such thresholds may be established globally or individually by point code of the local exchange tandem. No call control action may be taken unless one of these thresholds is first exceeded. Such circumstance is taken to be an indication that one or more of the shared trunk groups subtending the local exchange tandem is experiencing a call blocking condition. Such a condition alone is not sufficient to identify a call blocking issue related to a surge of traffic, such as that typically due to auto-dialer originated traffic. A second operation involves confirming that the condition is due to a sudden increase of traffic incoming to the local exchange tandem switch and identifying its source. For IAM messages incoming from transit networks, counts of IAMs are maintained for each uniquely received OPC/DPC pair contained in the routing label of the Signaling Information Field (SIF) of the received IAM. IAMs with OPCs of local exchange tandems may be excluded to reduce the possibility of control on calls accepted to the local exchange tandem. Such calls may be allowed to pass an IAM necessary to complete the next leg of the call to the end office switch without the possibility of triggering a control. Counts of IAMs are accumulated for a pre-defined time interval and over a pre-defined number of such time intervals given by N. Next, an algorithm can be defined to measure a sharp increase in IAMs for a given OPC/DPC or OPC/Calling Number and to trigger a response. Finally, a response can be defined to provide call admission control to temporarily limit the rate of traffic from the OPC and/or calling number to the local exchange switch tandem, identified by the matching point codes present in the OPC of release messages transmitted from the tandem and the DPC of IAM messages received by the tandem.

In still other embodiments of the present invention, call admission control can be achieved as follows: For each current time interval OPC/DPC pair count of IAMs, an average is taken over the N previous time intervals. A comparison is made between the count taken during the most recent of the current time interval with the average count taken among the previous N time intervals. If an increase in count and/or average count exceeds a pre-defined threshold, then further received IAM messages with the given OPC and/or Calling Number and local exchange tandem DPC are limited to a rate equal to the average rate or some multiple thereof for a period of time sufficient to allow for subsidence of the incoming traffic. A No Circuit Available release message may be returned to the sending network by the STP or other device upon discarding a received IAM. Information regarding discarded IAMs may be reported via usual office traffic measurements, alarms, and network management operations support systems. The time period for maintaining such call admission control may be given by a number of equal length time intervals previously defined for measuring LAM counts or defined using any time unit. Other techniques for detecting surges of call volume by OPC/DPC pair may be used, however, the presented embodiments have the following advantages with respect to controlling auto-dialer caused traffic congestion. First, it may be able to detect a sudden increase of common sourced traffic and mark such traffic for call admission control while eventually allowing (based on selection of pre-defined time and threshold parameters) any sustained increase in traffic to bypass call admission control and to be presented to the local network carrier's tandem switch. This allows for equitable distribution of call attempts on shared or common transport trunk groups where high call volumes are sustained. The carrier maintaining these shared trunk groups would be able to correctly analyze any sustained changes in traffic levels in order to identify the root cause of a blocking condition on the shared trunk group and to provide corrective action either through capacity engineering or fault resolution. A sustained increase in traffic is commonly manifested by retrial attempts during network faults or outages or by permanent changes in levels of customer traffic. To avoid masking problems that should be resolved by the network operator, it may be desirable to avoid call admission control during these conditions. Additionally, the embodiments discussed above may avoid unwarranted discrimination among competing users of shared facilities where the root cause of the call blocking/call volume increase condition may not be related to massive auto-dialers.

In still other embodiments of the present invention, a minimum count can be defined below which counts of received unique OPC/DPC pairs in the Signaling Information Field of the IAM messages are not tabulated for the purpose of controlling call admission to the network. This may be desirable where a need exists to minimize processing load and/or associated signaling response delay.

In still other embodiments of the present invention, counts of received unique OPC/DPC pair counts contained in the SIF need not be maintained for each unique OPC. Rather, counts may be maintained for each unique network or unique network/cluster or any other uniquely defined portion or range within the OPC. Using this approach, call admission control to the network can be based on any portion of the OPC. This may be particularly useful for establishing call admission control based on carriers that are assigned and utilize a specific network number portion of a point code (PC). In other words, where a single carrier has multiple switches with trunk groups established to the tandem switch of a local carrier, this may serve to simultaneously provide call admission control from all of the switches operated by that carrier as long as the point codes of that carrier's switches use the same network number portion of the point code. This may be advantageous where auto-dialer events may present traffic to the tandem switch of the local carrier via multiple switches of the carrier transporting the auto-dialer traffic.

In still other embodiments of the present invention, the Circuit Identification Code (CIC) of the SIF can be examined to allow or disallow call admission control for specific trunk circuits or ranges of trunk circuits. This can be used as a type of choke network for the purpose of controlling traffic to specific destinations defined by the DPC of the local exchange tandem in the received IAM. Various methods can be used to limit the number of simultaneous trunks used by calls originating from the identified OPC or Calling Number auto-dialer traffic source. These "choke" methods have advantages over establishing a rate threshold for call admission in that "choke" methods may reduce over controlling of auto-dialer traffic where average trunk hold time is low. Alternatively, more complex methods may be used to actually count and associate IAM and release messages in order to provide a maximum number of simultaneous new paths for the controlled traffic.

In still other embodiments of the present invention, control may further narrow the target of auto-dialer traffic by inspecting the called number exchange in received IAMs and relate it to end office switch destination point codes. The called number inspection may serve two purposes: First, the sudden increase of incoming traffic can be related to specific destination end office switches making possible the control of traffic by single end office switch rather than the control of traffic to all end office switches homed off the tandem. Second, choke control could be custom sized by the shared trunk group capacity of each end office switch. Utilizing called number inspection in this manner may involve an increased level of administration to maintain a current configuration of network exchanges and corresponding point codes in the software required to look up point codes corresponding to individual called numbers.

In still other embodiments of the present invention, the STP could use software to "learn" association of telephone numbers/exchanges and end office point codes by inspecting IAMs transmitted by tandem switches to extract and save called number/DPC relations. This approach may automate required administration of such data should the called number inspection solution described in the above-described embodiments be implemented. Additionally the STP may inspect CIC numbers in the same transmitted IAM messages to learn the maximum CIC number used for a specific end office DPC. This leaning function may provide the call control software with the size of the common transport trunk group between tandem switch and end office switch. This information may be used in algorithms to automatically establish a custom choke size for any controlled traffic to the end office switch. The maximum CIC number may be determined through repeated inspection of the CIC in each LAM transmitted with the DPC of the end office switch. Each time a larger value is found for a CIC number, the maximum CIC size is updated with the new value. It may not be required to run this process continuously on every IAM because the maximum CIC value may be quickly found.

In still other embodiments of the present invention, the above-described embodiments can be applied to the calling number or a range of calling numbers, such as can be performed by examination of 3 to 10 digits of the calling number. In such an embodiment, use of the calling number may be substituted for use of the OPC contained in the SIF of the received IAM for all of the previously given methods. Counts and call admission control would be based upon calling number to specific DPCs. This embodiment may be used independently of methods used to examine the OPC and/or CICs or it could be dependent on the above-described methods used for OPCs and/or CICs where it is used instead of an OPC based call admission control where algorithms are able to show that the source of the traffic surge is largely attributed to a single or a range of calling numbers rather than to all calling numbers associated with the presented OPC. Note that the presented OPC may not be the OPC of a switch serving the calling number, but the OPC belonging to an intermediate transit network. As such, the OPC may be presented in association with almost any calling number. Calling numbers may be routinely spoofed or suppressed from IAM messages, making the calling number method identification and control of auto-dialer congestion events impossible in some cases. For that reason, the OPC method may be used secondary to the calling number method should the carrier choose to utilize the calling number method.

In still other embodiments of the present invention, a reporting capability may be provided to help the network operator understand the nature, timing, location, and/or duration of traffic without actually controlling call admission. This may enable the operator to understand the potential impact prior to selecting parameter values for various detection and control methods. The parameters for time intervals, number of time intervals, and/or various count and percentage thresholds can be suitably defined and adjusted for optimum and/or desired performance. Based on historical data, it has been observed that nearly all such past events have durations between 1 and 15 minutes with typical durations between about 5 and 10 minutes. Given such assumptions, reasonable values for the stated time interval for measurement may be about 15 to 45 seconds. Reasonable values for number of previous time intervals to maintain may be about 3 to 10 and reasonable values for number of time intervals to maintain control of call admission may be about 10 to 60 depending on the length chosen for the time interval. A default selection for parameters may include a time interval with a duration of about 30 seconds, five previous time intervals plus the current time interval, and control for 20 time intervals. Safeguards may be implemented in parameter value selection software to limit selection to reasonable values.

In still other embodiments of the present invention, adjusting the rate at which calls originating from the OPC and/or the calling number are admitted to the network includes adjusting a minimum time that elapses between successive calls originating from the OPC and/or the calling number and are admitted to the network.

In further embodiments of the present invention, a call processing system includes a signal transfer point (STP) network element that is configured to associate call release messages, which can be indicative of call failures in the communication network, with an originating point code and/or a calling number and to adjust a rate at which calls originating from the originating point code (OPC) and/or the calling number are admitted to the network based on the association between the call release messages and the OPC and/or the calling number.

In further embodiments of the present invention, the call release messages include cause codes of no circuit available and/or unallocated number.

In still further embodiments of the present invention, the STP or other adjunct system capable of link monitoring and filtering is further configured to determine a count of no circuit available messages during a measurement interval, and/or determine a count of release messages due to unallocated number during the measurement interval.

In still further embodiments of the present invention, the STP or other adjunct system capable of link monitoring and filtering is further configured to determine if the count of no circuit available release messages exceeds a no circuit available threshold, and/or determine if the count of unallocated number release messages exceeds an unallocated number threshold.

In still further embodiments of the present invention, the STP or other adjunct system capable of link monitoring and filtering is further configured to determine a count of Initial Address Messages (IAM) from the OPC to a destination point code (DPC) for the measurement interval, and/or determine a count of IAMs from a calling number to the DPC for the measurement interval.

In still further embodiments of the present invention, the STP or other adjunct system capable of link monitoring and filtering is further configured to determine an average count of IAMs from the OPC to the DPC over N previous measurement intervals, and/or determine an average count of IAMs from a calling number to the DPC over the N previous measurement intervals.

In still further embodiments of the present invention, the STP or other adjunct system capable of link monitoring and filtering is further configured to subtract the average count of IAMs from the OPC to the DPC over N previous measurement intervals from the count of IAMs from the OPC to the DPC for the measurement interval to obtain a result, divide the result by the average count of IAMs from the OPC to the DPC over N previous measurement intervals to obtain a percentage increase in IAMs from the OPC to the DPC, determine if the result exceeds an OPC to DPC count threshold, determine if the percentage increase in IAMs from the OPC to the DPC exceeds a percentage OPC to DPC threshold, and reduce the rate at which calls originating from the OPC are admitted to the network if the result exceeds the OPC to DPC count threshold and/or the percentage increase in IAMs from the OPC to the DPC exceeds the percentage OPC to DPC threshold if the count of no circuit available messages exceeds the no circuit available threshold and/or if the count of unallocated number messages exceeds an unallocated number threshold.

In still further embodiments of the present invention, the STP or other adjunct system capable of link monitoring and filtering is further configured to subtract the average count of IAMs from the calling number to the DPC over N previous measurement intervals from the count of IAMs from the calling number to the DPC for the measurement interval to obtain a result, divide the result by the average count of IAMs from the calling number to the DPC over N previous measurement intervals to obtain a percentage increase in IAMs from the calling number to the DPC, determine if the result exceeds a calling number to DPC count threshold, determine if the percentage increase in IAMs from the calling number to the DPC exceeds a percentage calling number to DPC threshold, and reduce the rate at which calls originating from the calling number are admitted to the network if the result exceeds the calling number to DPC count threshold and/or the percentage increase in IAMs from the calling number to the DPC exceeds the percentage calling number to DPC threshold if the count of no circuit available messages exceeds the no circuit available threshold and/or if the count of unallocated number messages exceeds an unallocated number threshold.

In still further embodiments of the present invention, the STP or other adjunct system capable of link monitoring and filtering is further configured to adjust a minimum time that elapses between successive calls originating from the OPC and/or the calling number and are admitted to the network.

Although described above primarily with respect to method and system embodiments of the present invention, it will be understood that the present invention can be embodied as methods, systems, and/or computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
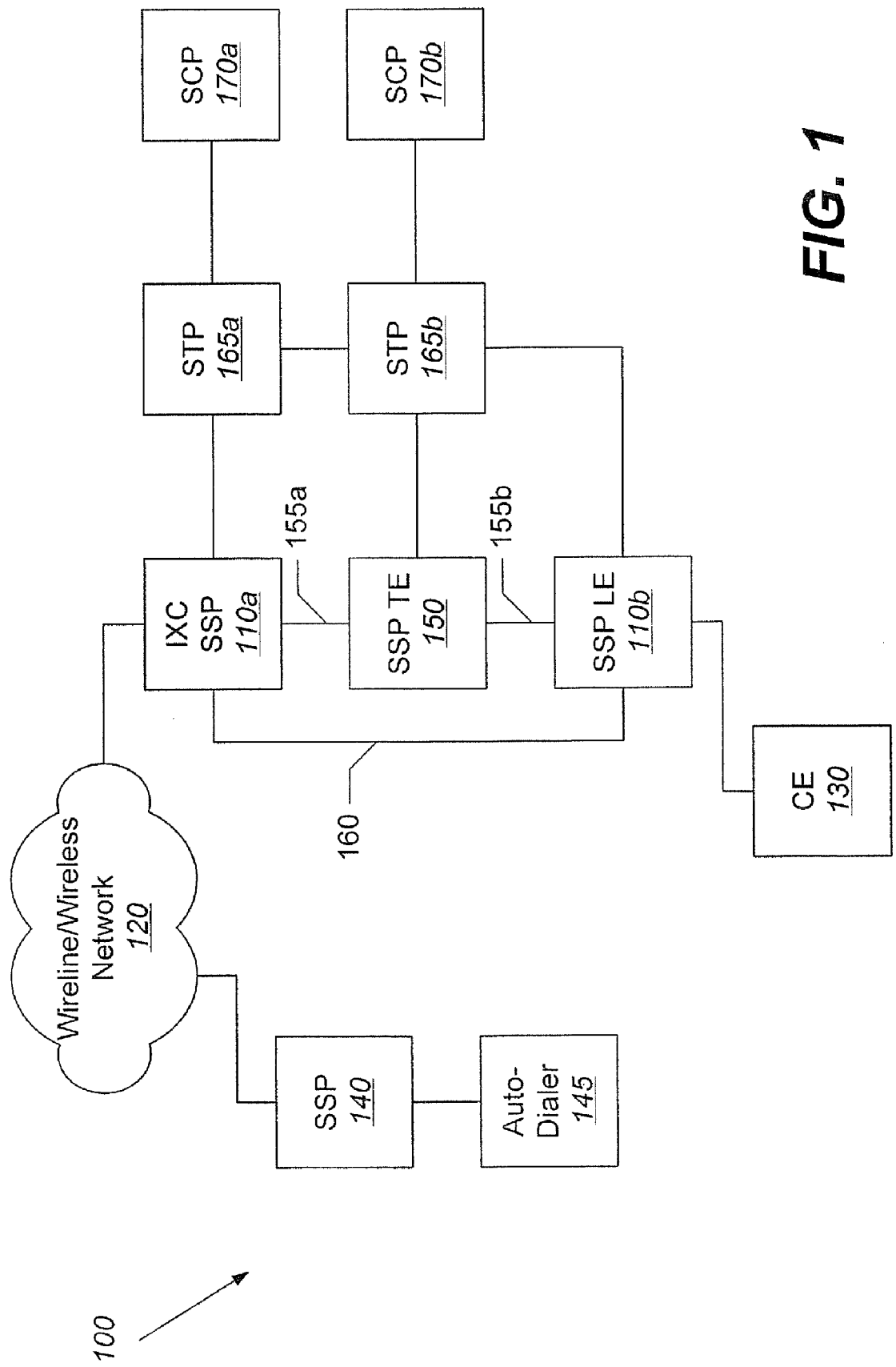
FIG. 1 is a block diagram that illustrates a communication network architecture for managing traffic congestion in a network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

For purposes of illustration, some embodiments of the present invention are described herein with respect to use of a Signaling System 7 (SS7) network to detect sources of excessive call volume and to manage traffic congestion in a communication network. It will be understood, however, that embodiments of the present invention are not limited to SS7 networks or any particular Common Channel Signaling (CCS) network, but instead may be embodied generally as any network architecture capable of carrying out the operations described herein. In addition, some embodiments of the present invention are illustrated in the context of a circuit switched communication network, such as the public switched telephone network (PSTN). It will be understood, however, that embodiments of the present invention are not limited to any particular type of communication network, but can be embodied in various types of communication networks including, but not limited to, circuit switched networks and packet switched networks, such as Voice Over Network (VoN) or Voice Over Internet Protocol (VoIP) networks.

Some embodiments of the present invention arise from a realization that call release messages, which are indicative of call failures, can be analyzed and associated with an originating point code (OPC) and/or calling number based on patterns detected in the call setup messaging, e.g., the sources of Initial Address Messages (IAMs) that are used setting up calls. If an excessive number of calls for a particular Destination Point Code (DPC), i.e., the receiving signaling point, is determined to have originated from a particular Originating Point Code (OPC), i.e., the originating signaling point, and/or particular calling number, then the call attempts originating from such a source may be throttled so as to reduce congestion in the network. For example, auto-dialer systems may generate large amounts of traffic in a communication network destined for a particular central switching office. If this traffic is carried on shared trunk groups or facilities, then other customers on such a facility may experience lost calls and/or connection delays. By detecting the source of the excess traffic as coming from an auto-dial system associated with a particular OPC, some embodiments of the present invention may reduce the rate of traffic coming from the OPC associated with the auto-dial system to reduce congestion on shared resources, such as shared trunk groups or facilities, and thereby provide improved service for customers whose traffic is carried by the shared facilities.

Referring now to FIG. 1, an exemplary SS7 network architecture 100 for managing traffic congestion in a network through detection of a source of excessive call volume, in accordance with some embodiments of the present invention, comprises Service Switching Points (SSPs) 110a and 110b that are connected to a wireless/wireline network 120 and customer equipment (CE) 130, respectively. It will be understood that CE 130 may represent one or more devices that may be used to originate and or terminate a call over a communication network, such as the public switched telephone network (PSTN). In some embodiments, the CE 130 may represent one or more mobile terminals. As used herein, the term "mobile terminal or device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The SS7 network further comprises an SSP 140 that services an auto-dialer system 145. The auto-dialer system 145 may be associated with a variety of different types of organizations. For example, the auto-dialer system 145 may be used by a governmental authority to notify people in a certain area of an event, such as an emergency or civic function. The auto-dialer system 145 may also be used by an organization to contact large numbers of people for various purposes, such as taking a survey, advertising a product, requesting a charitable donation, requesting a vote for a political candidate, and the like. The auto-dialer system 145 may be associated with a particular calling number and/or may be indirectly associated with the OPC that is associated with the SSP 140.

The SSPs 110a and 110b are switches that originate, terminate, and route calls and provide entry into the SS7 network. SSPs 110b along with SSP 140 may be called "local exchange" switches because they terminate connections to end-users. SSP 150 may be called a "tandem exchange" because it does not terminate connections to end users, but instead terminates only trunks 155a and 155b to other SSPs (e.g., SSPs 110a and 110b). SSPs 110a, 110b, and 140 may be referred to as Class 5 switching systems while SSP 150 may be referred to as a Class 4 switching system. As shown in FIG. 1, SSPs 110a and 110b may be connected via trunks or facilities 155a and 155b through the tandem SSP 150. Trunks or facilities 155b may be shared by any provider connected to the Class 4 switch 150 for the purpose of completing calls to customer equipment 130 served by local exchange switch 110b. SSPs 110a and 110b may also be directly connected via a trunk or facility 160 that is dedicated to a particular network service provider customer. For example, an Inter-Exchange Carrier (IXC) may purchase a trunk group or facility to carry its customer's traffic so as not to have to share trunking resources, i.e., trunks 155a and 155b with other network users. Thus, the SSP 110a may be part of the IXC network. Where an IXC purchases direct trunks and facilities, typically call traffic is first routed over the direct trunk or facility 160, then overflow routed via trunks and facilities 155a and 155b through the tandem switch 150, thus utilizing the shared trunk or facility 155b.

In an SS7 network, SSPs send signaling messages to other SSPs to setup, manage, and release network resources to complete calls/connections. The signaling traffic between SSPs is carried by one or more Signal Transfer Points (STPs). As shown in FIG. 1, STPs 165a and 165b may be used to send SS7 signaling messages between SSPs 110a and 110b and/or to other SSPs not shown in FIG. 1. An STP is typically embodied as a packet switch that routes each incoming message to an outgoing signaling link based on routing information contained in the SS7 message.

The SS7 network 100 further comprises Signal Control Points (SCPs) 170a and 170b, which may optionally be used to provide Intelligent Network (IN) services by allowing the SSPs in the SS7 network to access the SCPs via special signaling messages.

The auto-dialer system 145 may generate excessive call volume destined for a particular geographic area. For example, the auto-dialer system may be configured to dial numbers consecutively, which typically results in large numbers of calls being routed to customers being serviced by SSPs associated with a single DPC. In the example embodiments shown in FIG. 1, the auto-dialer system 145 may be configured to generated large numbers of calls that are destined for customer equipment 130 serviced by SSP 110b. This may result in traffic congestion on the trunks and/or facilities 155a and 155b that carry the traffic originated by the auto-dialer system 145 to the SSP 110b. Some embodiments of the present invention may allow the STPs 165a and/or 165b to detect that the OPC and/or the calling number associated with the auto-dialer system 145 is the source of an excessive amount of call volume that is causing congestion on the shared trunks and/or facilities 155a and/or 155b. By determining the source OPC and/or calling number of the excessive call volume, the incoming call rate from that source can be reduced thereby reducing congestion and/or instances of dropped calls on the trunks and/or facilities 155a and/or 155b and providing for a more equitable division of trunk resources among the various customers and/or network service providers that share the trunks and/or facilities 155a and 155b.

The various elements of the communication network 100 may be connected by a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

Figure 2:
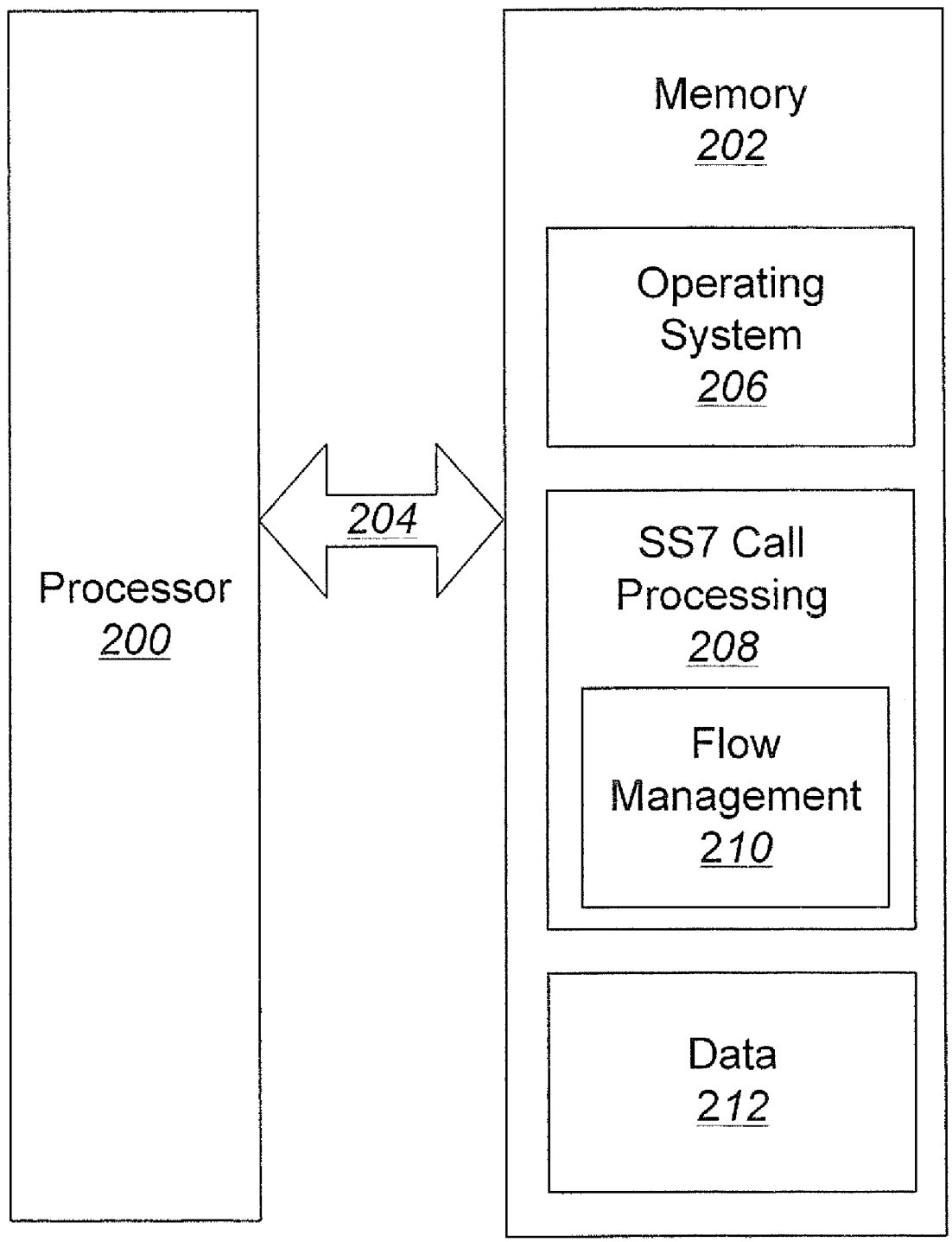
FIG. 2 is a block diagram that illustrates a software/hardware architecture for a signal transfer point (STP) in accordance with some embodiments of the present invention.

FIG. 2 illustrates a processor 200 and a memory 202 that may be used in embodiments of methods, systems, and computer program products for detecting sources of excessive call volume and managing traffic congestion in a communication network. For example, in some embodiments of the present invention, the processor 200 and memory 202 may be used to embody the processors and the memories used in the STPs 165a and/or 165b of FIG. 1. The processor 200 communicates with the memory 202 via an address/data bus 204. The processor 200 may be, for example, a commercially available or custom microprocessor that is suitable for use in a real-time telecommunication system, such as a Class 5 and/or Class 4 switching system. The memory 202 is representative of the overall hierarchy of memory devices containing the software and data used to process SS7 signaling and to detect sources of excessive call volume and manage traffic congestion, in accordance with some embodiments of the present invention. The memory 202 may include, but is not limited to, the following types of devices: cache, ROM, PROM, EPROM, EEPROM, flash, SRAM, and DRAM.

As shown in FIG. 2, the memory 202 may hold three or more major categories of software and data: an operating system 206, a call processing module 208, and a data module 212. The operating system 206 controls the operation of the STP. In particular, the operating system 206 may manage the STP's resources and may coordinate execution of programs by the processor 200.

The call-processing module 208 may provide the logic for processing the out-of-band signaling messages for originating, routing, terminating, and/or maintaining calls on the SSPs. For example, to process call originations, the call processing module 208 may be configured to process IAMs. The IAM is a message that is used as part of the SS7 ISDN User Part (ISUP) layer. The ISUP layer corresponds generally to parts of the transport through application layers in the Open Systems Interconnect (OSI) seven-layer model. ISUP defines the protocol and procedures used to set-up, manage, and release network resources that carry calls over a communication network, such as the PSTN. ISUP is used for both ISDN and non-ISDN calls. An IAM message is forwarded from the originating SSP to the terminating SSP via the STPs in the SS7 network. The IAM contains the called party number in the mandatory variable part of the message and contains the calling party number in the optional variable part of the message. If a call were to fail, the call processing module 208 may process a call release message transmitted from one of the SSPs. Examples of call release messages include a no circuit available message indicating, for example, that the communication network does not have sufficient resources to complete the call, and an unallocated number message. Unallocated number messages may be generated due to activity by an auto-dialer system because the auto-dialer system may be configured to dial a large group of directory numbers in sequence when many of these numbers are often unassigned.

The call processing module 208 comprises a flow management module 210 in accordance with some embodiments of the present invention. The flow management module 210 may be configured to associate call release messages, which are indicative of call failures in the communication network, with the OPCs and/or calling numbers associated with the failed calls. In this way, the flow management module 210 may identify a source or sources of excessive call volume in the communication network, such as the auto-dialer system 145 shown in FIG. 1, and take action to reduce the rate at which calls originating from the OPC(s) or calling numbers are admitted to the network so as to avoid overloading shared resources, such as the shared trunks and/or facilities 155a and 155b of FIG. 1. Such a reduction in admission rate for calls originating from particular sources may provide a more equitable distribution of traffic on shared trunks and/or facilities among multiple customers.

The data module 212 may be used to hold the data collected and/or generated by the flow management module 210 in determining whether to adjust the rate at which calls originating from one or more OPCs and/or calling numbers are admitted to the network Although FIG. 2 illustrates an exemplary software architecture that may facilitate detecting sources of excessive call volume and managing traffic congestion in a communication network, it will be understood that the present invention is not limited to such a configuration but is intended to encompass any configuration capable of carrying out the operations described herein.

Computer program code for carrying out operations of STPs discussed above with respect to FIG. 2 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, client devices, and/or computer program products in accordance with some embodiments of the invention. These flowchart and/or block diagrams further illustrate exemplary operations of detecting sources of excessive call volume and managing traffic congestion in a communication network in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
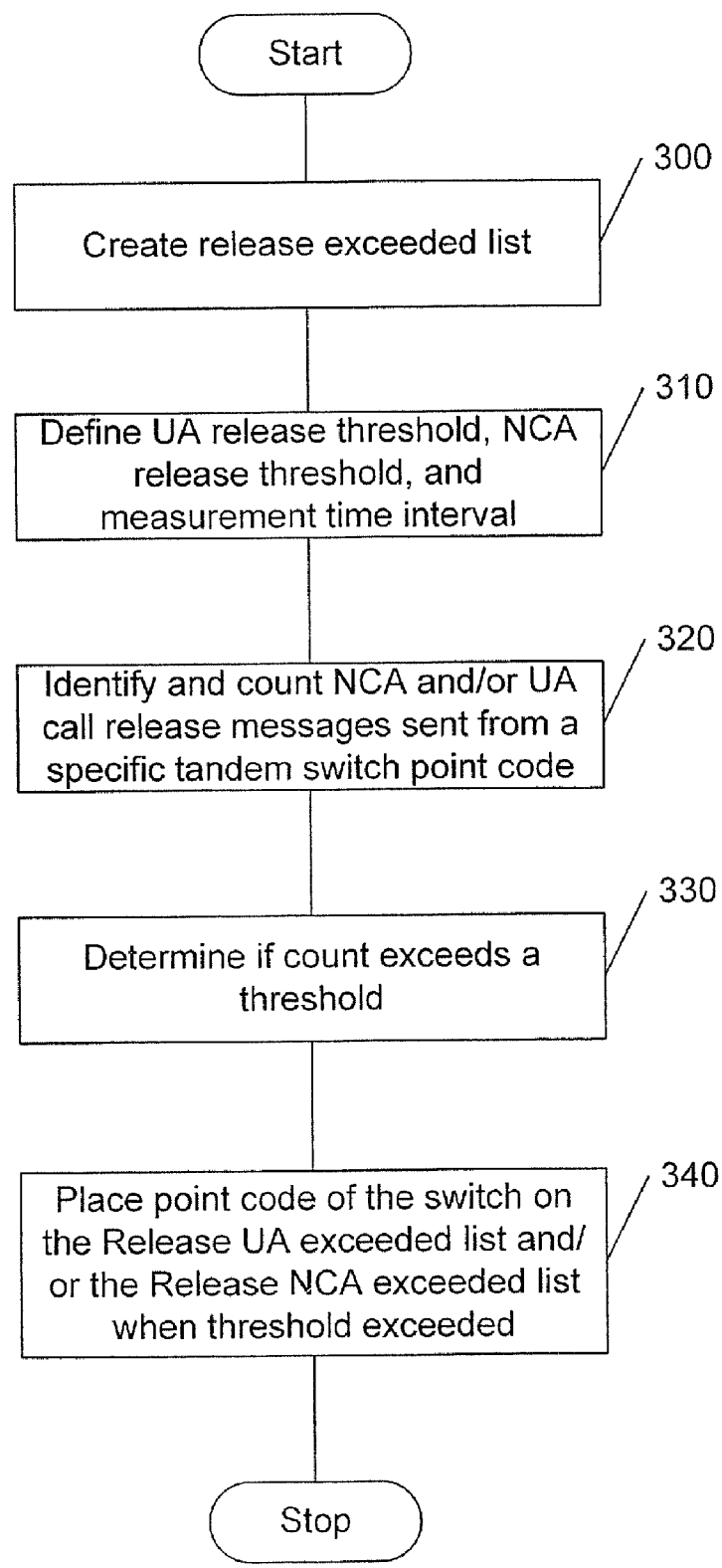
FIGS. 3-8 are flowcharts that illustrate operations for managing traffic congestion in a network in accordance with some embodiments of the present invention.

Operations for detecting sources of excessive call volume and managing traffic congestion in a communication network, in accordance with some embodiments of the present invention, will now be described with reference to the flowcharts of FIGS. 3-8 and the architecture diagrams of FIGS. 1 and 2. Referring now to FIG. 3, a measurement interval is defined at block 310. The flow management module 210 determines a count of no circuit available (NCA) and/or unallocated number (UA) messages during the measurement interval for each tandem SSP supported by the STP at block 320. The flow management module 210 determines at block 330 whether the NCA count and/or UA count exceeds a NCA count threshold and/or a UA count threshold, respectively. At block 340, the data module 212 is used by placing the point code of a tandem switch exceeding one of the thresholds on either a Release_UA_Exceeded or Release_NCA_Exceeded list. Essentially, this procedure may use measures of call blocking cause 34 (RELEASE NCA) and/or UA for identifying candidate tandem switches for possible call admission control in accordance with some embodiments of the present invention.

Figure 4:
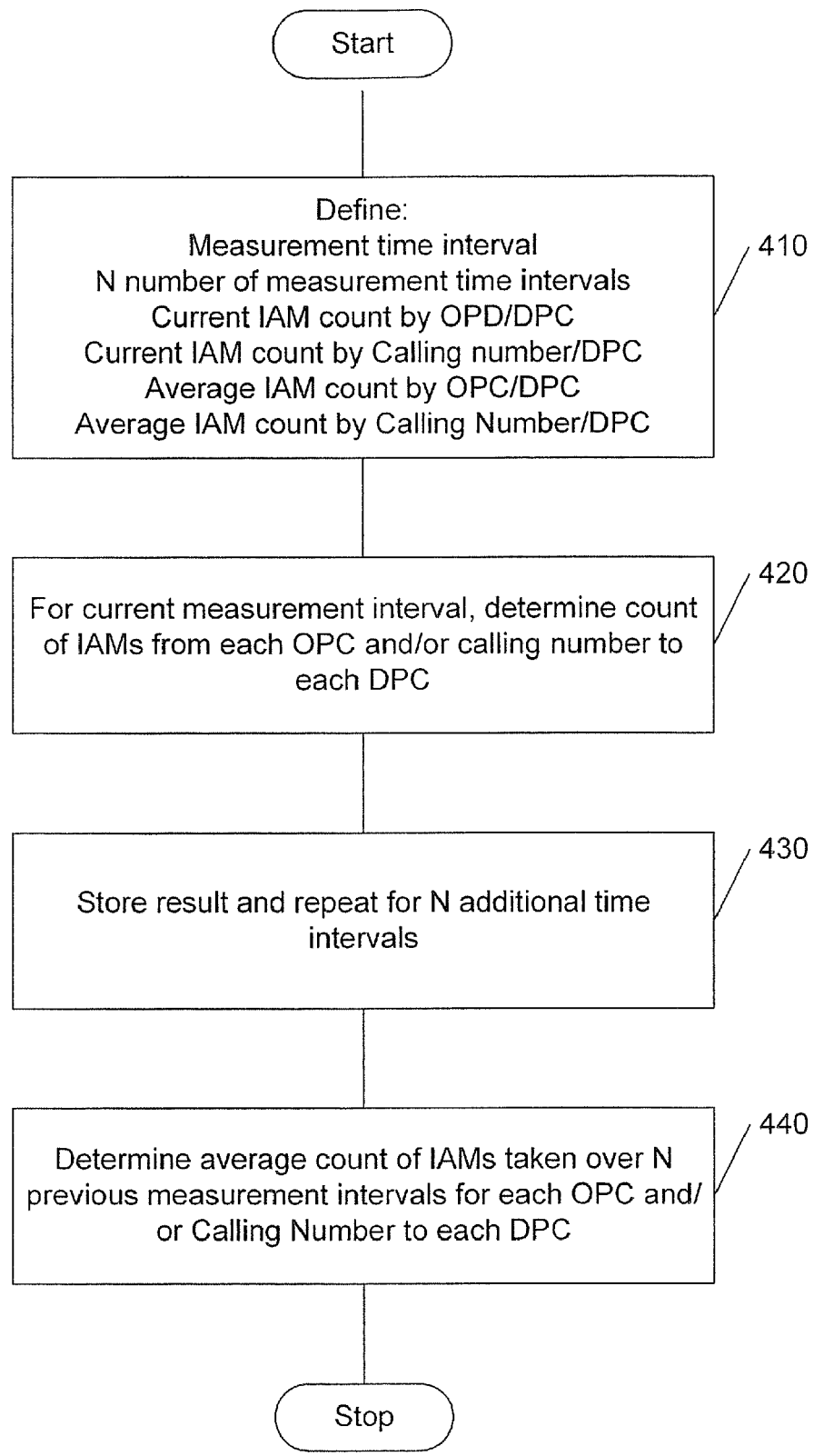

Referring now to FIG. 4, the flow management module 210 attempts to determine the source of excessive call volume in the network. A measurement time interval and a number of time intervals to maintain a history of counts are defined at block 410. The flow management module 210 determines at block 420 the count of IAMs from the OPC and/or the calling number to each DPC in the local exchange carrier's network for a defined time interval. This information is maintained in the data module 212 such that the flow management module 210 may determine an average count of IAMs from the OPC and/or the calling number to the particular DPCs for N previous measurement intervals. In detail, the embodiments depicted in FIG. 4 may be used to detect a surge in call volume to the DPC of a specific end office switch by measuring certain counts of IAMs over time intervals. These embodiments may also define current and average counts of IAMs by OPC/DPC and Calling Number/DPC. At block 420, counts of IAMs are accumulated and determined for the current time interval from each common source OPC or Calling Number to each possible DPC. The calculated count is stored at block 430 and the counting procedure is repeated for N additional time periods. At block 440 the average counts for the N previous time periods are calculated for each OPC and Calling Number received in an IAM message. The embodiments shown in FIG. 4 may provide a means to store common sourced historical average counts of traffic and the current counts for traffic for use in later operations in accordance with some embodiments of the present invention.

Figure 5:
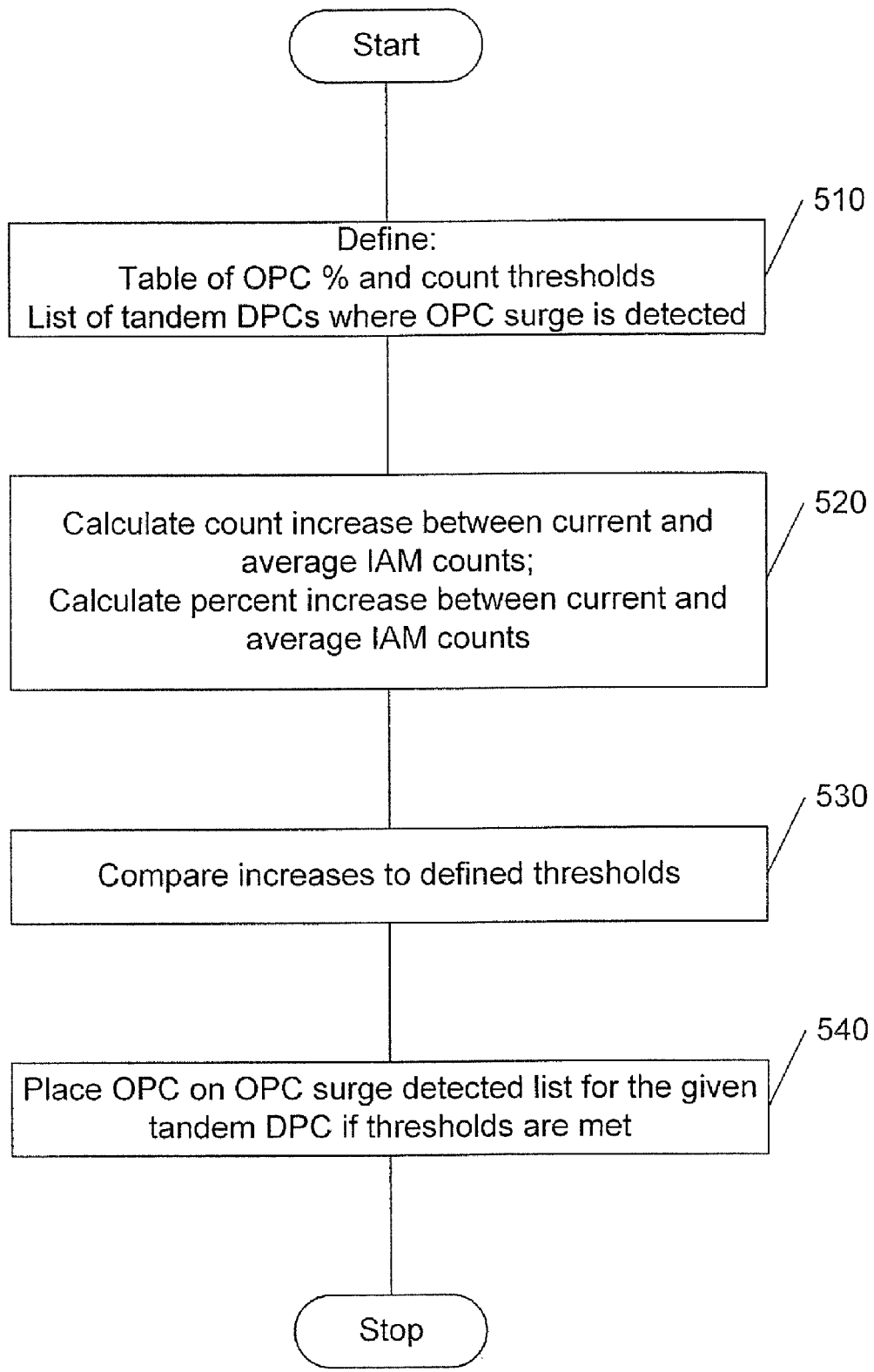

Referring now to FIG. 5, at block 510 a table of percent increase and count increase threshold definitions is provided. At block 520, the flow management module 210 may subtract the average OPC IAM count over the N previous measurement intervals from the current OPC IAM count to obtain a result that indicates how much of an increase in call originations has occurred for a particular OPC relative to the average number of call originations over N previous measurement intervals. At block 520, the average OPC TAM count over the N previous measurement intervals is compared to the current interval OPC IAM count to obtain a percentage increase in OPC IAMs in the current measurement interval relative to the N previous measurement intervals. Based on the calculations made at block 520, the flow management module 210 may reduce the admission rate for calls from an OPC if the result obtained at block 520, i.e., the increase in call originations for the OPC relative to the average number of call originations over the N previous intervals, exceeds an OPC to DPC count threshold and/or if the percentage increase in OPC IAMs in the current measurement interval relative to the N previous measurement intervals exceeds a percentage OPC to DPC threshold. Thus, the flow management module 210 may invoke call admission control to reduce the rate of calls being admitted to the network from a particular OPC based on whether the current count of IAMs from a particular OPC exceeds the running average by a particular amount and/or whether the percentage increase in IAMs from the OPC exceeds a percentage threshold. Network administrators may adjust the thresholds, length of measurement intervals for counting call release messages, and/or IAMs, and/or the test(s) to be used for determining whether to reduce the call admission rate, i.e., OPC IAM increase (block 520) or OPC IAM percentage increase (block 520), based on the particular traffic patterns in the network and tolerance for accepting congestion on shared trunks and/or facilities. Further detail of the flow depicted in FIG. 5, provides definition of operations to apply thresholds to the counts of received IAMs containing common OPCs. This is performed to arrive at a decision regarding whether a surge of incoming call volume from the OPC is taking place. Also defined is a list for adding the point codes of tandems for which an incoming surge of call volume was detected. At block 520, the percentage and count increase in incoming IAMs using the counts generated in the previous procedure shown in FIG. 4 are calculated. At block 530, the increases calculated in block 520 are compared with thresholds that have been established. In some embodiments, both a minimum increase in count and percentage may be required to meet the overall threshold requirement. At block 540, any OPC exceeding the threshold(s) are placed on a OPC Surge Detected list for the given tandem switch. The embodiments shown in FIG. 5 complete the process for identifying an incoming surge of call volume at a tandem switch by its source OPC. This taken with the embodiments shown in FIG. 4 confirming that calls received by the tandem switch are encountering significant blocking due to No Circuit Available, may justify temporary control action on the source of the surging incoming call volume.

Figure 6:
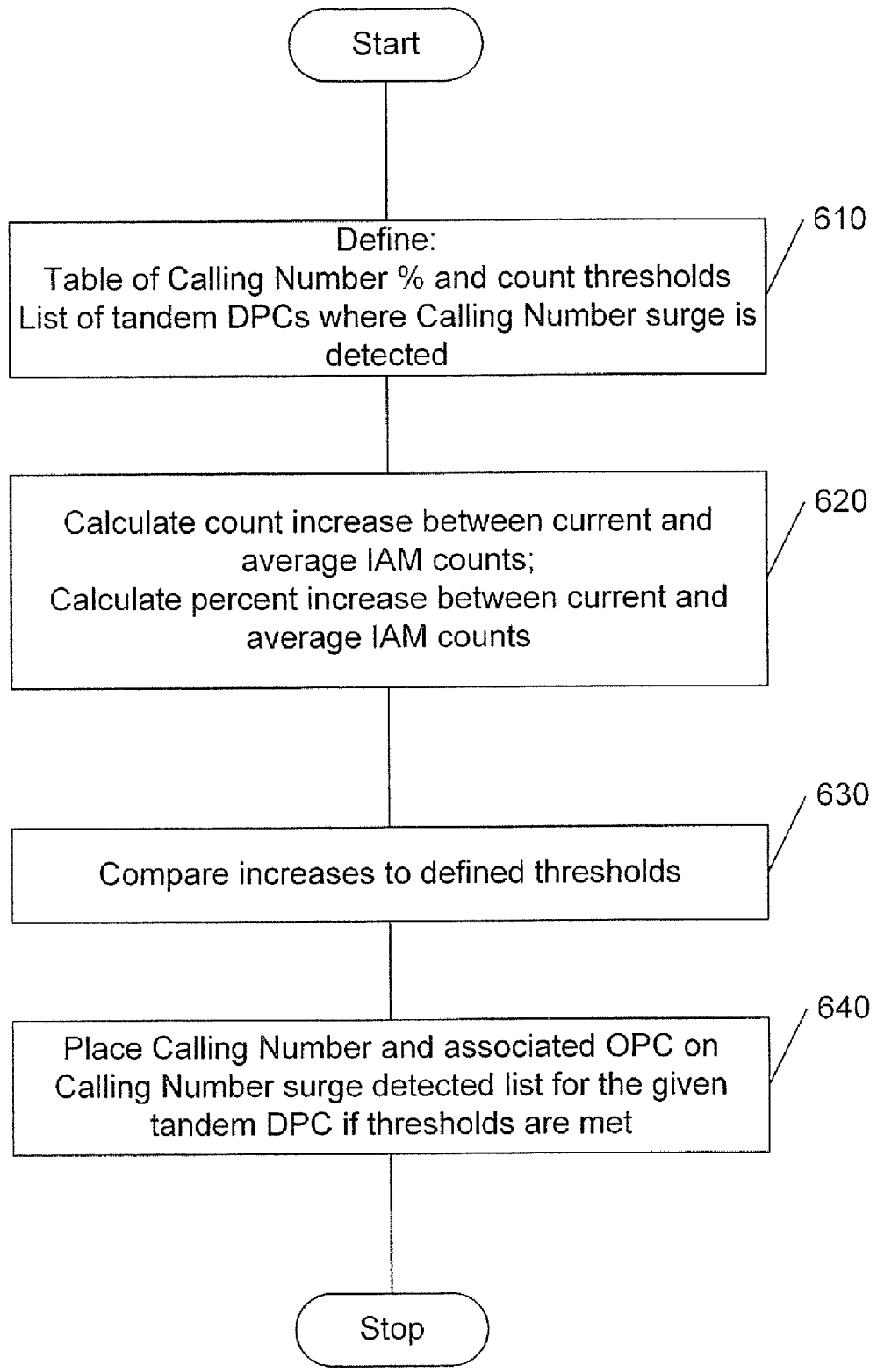

Referring now to FIG. 6, embodiments are provided to apply thresholds to the counts of received IAMs sharing the same Calling Number to make a decision whether there was a surge of incoming call volume from the Calling Number. At block 610, a table of percent increase and count increase thresholds is defined. Also defined is a list for placing the point codes of tandems for which an incoming surge of call volume was detected. At block 620, the percentage and count increase in incoming IAMs using the counts generated in the embodiments illustrated in FIG. 5 are calculated. At block 630, the increase calculated at block 620 is compared with thresholds that have been established. In some embodiments, both a minimum increase in count and percentage may be required to meet the overall threshold requirement. At block 640, any Calling Number exceeding the threshold(s) may be placed on a Calling Number Surge Detected list for the given tandem switch. The embodiments illustrated in FIG. 6 may show that an incoming surge of call volume took place at a tandem switch and identify the call volume increase by its source Calling Number. This taken with the embodiments illustrated in FIG. 4 to have determined that calls for that tandem switch are encountering significant blocking due to No Circuit Available may justify temporary control action on the source of the surging incoming call volume.

Figure 7:
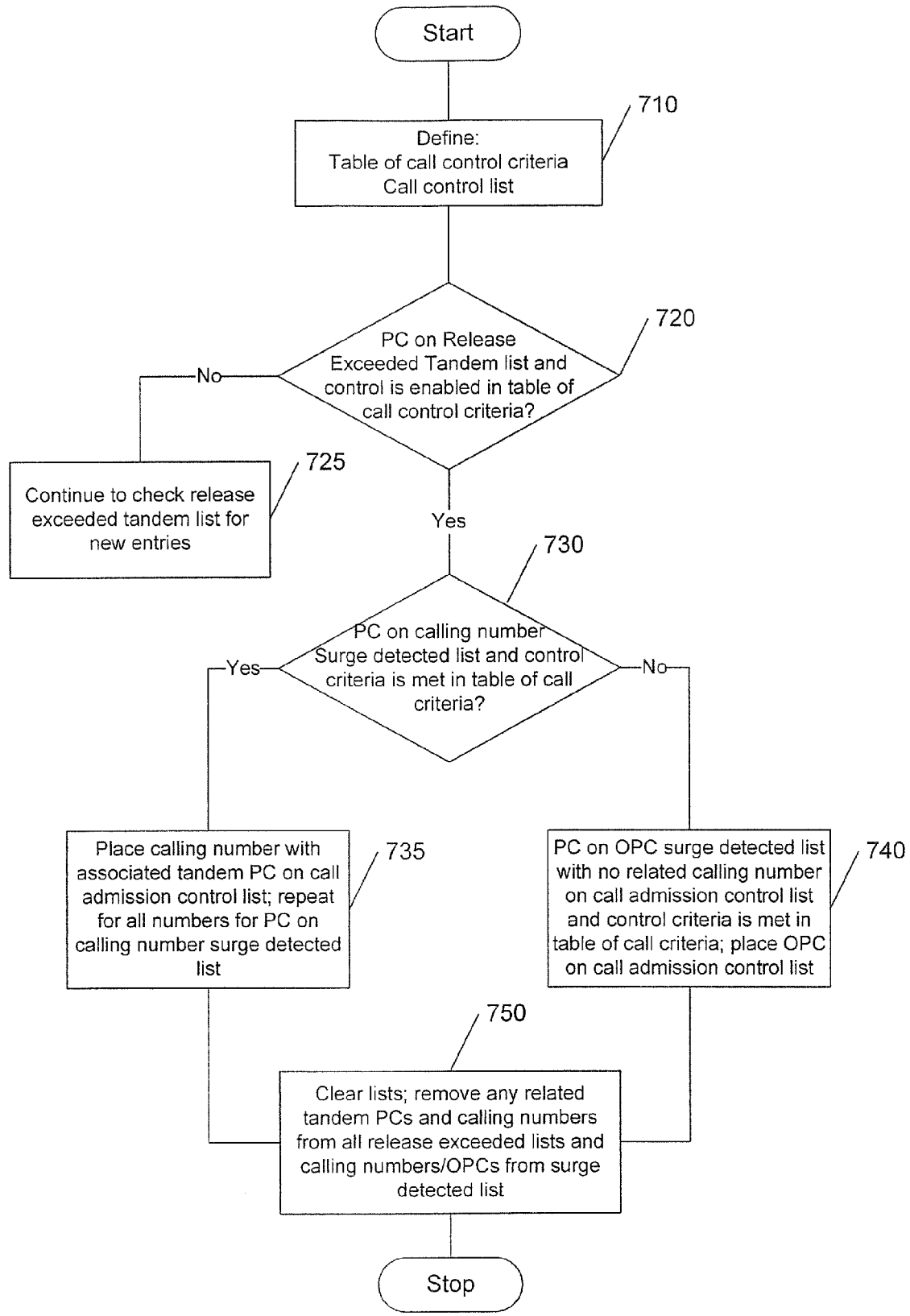

Referring now to FIG. 7, embodiments are provided to place a Calling Number or OPC on an incoming Call Control list for a given tandem switch. At block 710 a table of Call Control Criteria is defined. This table can be designed with a number of fields to allow the user to control and enable various aspects of the actual call control in accordance with various embodiments of the present invention. For example, the Call Control Criteria table may be used to enable or disable control by Calling Number, by OPC, or both and could be used to selectively enable such controls by tandem switch. At block 720 it is required that the Point Code of the tandem switch be found on the Release Exceeded list prior to allowing appearance on the Call Control List. Otherwise, the Release_Exceeded_Tandem list is checked for new entries at block 725. At block 730 it is required the Point Code of the tandem appears on the Calling Number Surge Detected list before allowing appearance on the Call Control List. Checks are made with Call Control Criteria to ensure that Calling Number control is enabled for the tandem. If not enabled, the Calling Number should never appear on the Call Control List. At block 735 this operation is repeated by checking all numbers on the Calling Number Surge Detected list related to the PC of the tandem switch and placing each on the Call Control List. At block 740 the case where an OPC appears on an OPC Surge Detected list where there are no Calling Numbers identified for the Call Control List that are related to the OPC is handled. In other words, it is not desired to place both the Calling Number and the OPC for the Calling Number on the Call Control list. The Calling Number receives precedence, being placed on the Call Control list instead of the OPC. Given sufficient information to identify the source, this allows the control to be targeted as narrowly as possible to the source. At block 750, tandem PCs are removed from the Release Exceeded list and OPCs and Calling Numbers from Surge Detected lists. These lists may be cleared to allow for recalculation and posting to these lists on future iterations of the procedure.

Figure 8:
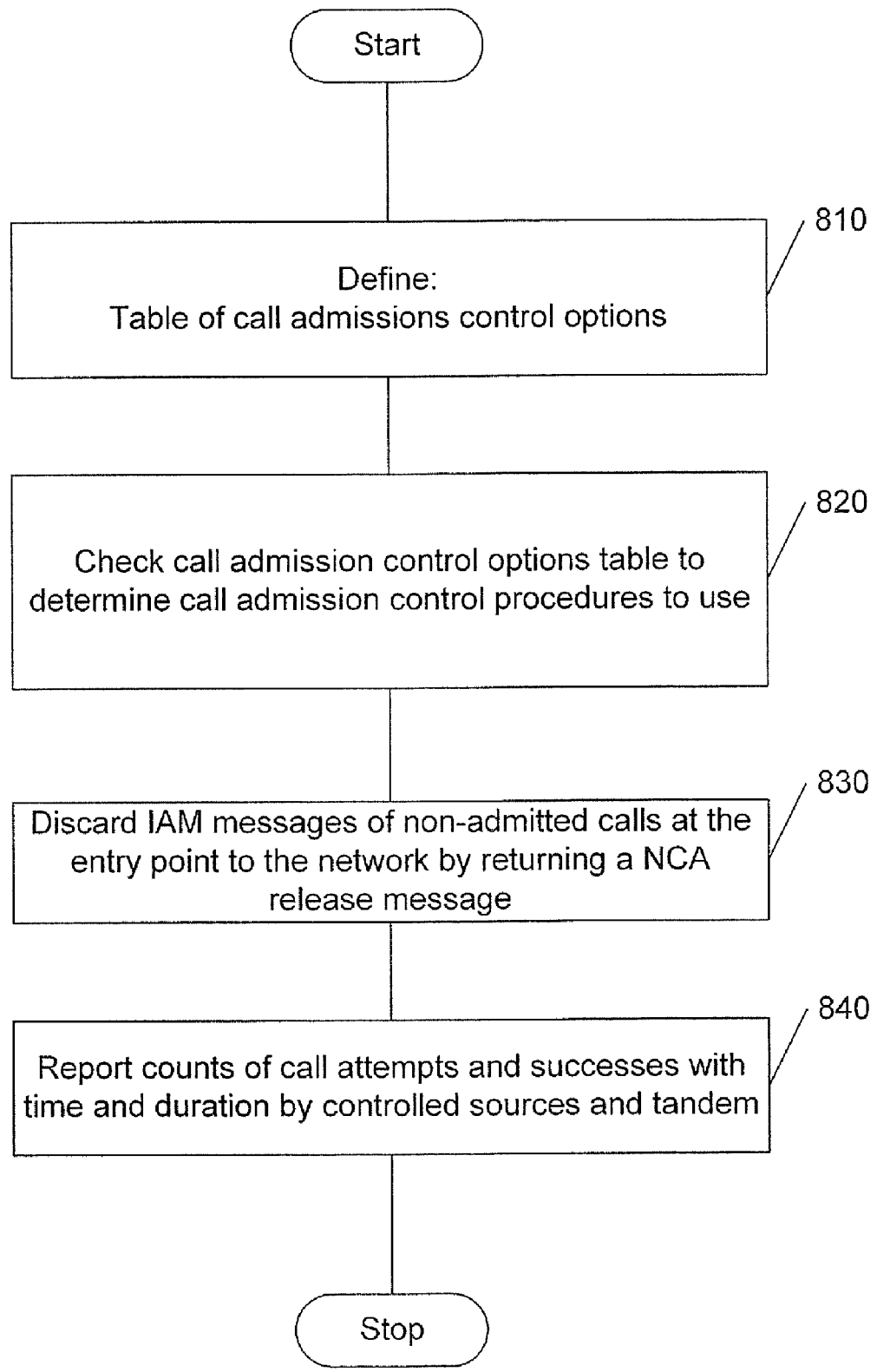

Referring now to FIG. 8, operations begin where the flow management module 210 associates call release messages with an OPC and/or a calling number. At block 810 a table of call admission control options is defined to allow the user to choose from various configurations for handling call admission control. For example, in the case of congestion on shared trunk groups and/or facilities, an STP may associate call release messages, such as no circuit available and/or unallocated number messages, from each tandem SSP that the STP supports. At block 820, the flow management module 210 may adjust the incoming call rate from calls originating from a particular OPC and/or calling number based on the association. For example, if the flow management module 210 determines that a particular OPC and/or calling number is responsible for an excessive amount of call volume, such as may be caused by an auto-dialer system, then calls originating from such an OPC and/or calling number may be denied entry into the network so as to reduce the call load on shared trunk groups and/or facilities. Various embodiments for associating call release messages with an OPC and/or a calling number and adjusting the call rate for calls originating from an OPC and/or calling number based on the association are described in more detail below. For purposes of illustration, but not limited thereto, the embodiments are described with reference to detecting excessive call volume on shared trunk groups and/or facilities terminating on tandem SSPs. Specifically, FIG. 8 illustrates embodiments that apply call admission control to any IAM received with a DPC for a given tandem containing a Calling Number or OPC on the call control list. At block 820 a check of the Call Admission Control Options table is provided to determine how call admission control will take place. Examples that can be set for Call Admission Control include the duration and rate or GAP of the control and the type of response that should be returned for an incoming IAM that has been selected for discard. Optionally, the Call Admission Control method can be chosen to be "choke" rather than "GAP." Using "choke." a set of allowed Circuit Identification Codes (CIC) are designated only for which incoming IAMs for the call control listed OPC or Calling Number will be allowed. At block 830, the actual selection and discard of incoming IAM messages for OPCs and Calling Numbers on the call admission control list is performed. At block 840, a function to report call attempts and successes by time, duration, controlled source, and tandem switch may be provided.

In some embodiments of the present invention, the flow management module 210 may adjust the rate at which calls originating from an OPC and/or a calling number are admitted to the network by adjusting a minimum time that elapses between successive calls originating from the OPC and/or the calling number that are granted admission to the network. In the case of an auto-dialer system, for example, the call admission control measures discussed above may be applied for about 10-15 minutes if the auto-dialer system appears to be targeting a single central office that is accessed by a tandem off. If, however, it appears that the auto-dialer system is targeting multiple central office switches that are accessed via a single tandem switch, then the call admission control measures may be applied for about 20-60 minutes.

In other embodiments, it may be desirable to create a "white list" containing certain directory numbers that are exempt from the call admission control described above because of their criticality to the public. For example, emergency notification telephone numbers may be placed on a white list such that even if these numbers are associated with a particular OPC for which call admission control is to be applied, calls originating from these numbers may not be blocked unless all network resources are expended.

Some embodiments of the present invention may use analysis and screening of SS7 messaging to identify a source of network congestion and to release a portion of further call origination requests from this source until the congestion problem is resolved. The control may be applied to any call or session setup protocol including, but not limited to, traditional time domain multiplex (TDM) voice or VoIP using the SS7 protocol at the entry point to the network. This control may be implemented without modification to existing SS7 signaling protocols. This control may be implemented without modification to existing SS7 signaling protocols.

These methods can be extended to a pure VoIP scenario that uses Session Initiation Protocol (SIP). Call origination or session requests that may result in excessive common source originated traffic to an IP router or switch can be denied. In such a case, the IP router or switch is an analog to the narrowband tandem switch.

The flowcharts of FIGS. 3-8 illustrate the architecture, functionality, and operations of embodiments of methods, systems, and/or computer program products for managing traffic congestion in a network through detection of a source of excessive call volume. In this regard, each block represents a module, segment, or portion of code, which comprises one or more executable instructions for implementing the specified logical function(s). It should also be noted that in other implementations, the function(s) noted in the blocks may occur out of the order noted in FIGS. 3-8. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of operating a communication network that includes a signaling system seven network, comprising:

associating call release messages, which are indicative of call failures in the communication network, with an originating point code and a calling number; and adjusting a rate at which calls originating from the originating point code and the calling number are admitted to the network based on associations between the call release messages and the originating point code and the calling number;

wherein the call release messages comprise no circuit available messages and unallocated number messages;

wherein associating the call release messages comprises:

determining a count of no circuit available messages during a measurement interval;

determining a count of unallocated number messages during the measurement interval;

determining if the count of no circuit available messages exceeds a no circuit available threshold;

determining if the count of unallocated number messages exceeds an unallocated number threshold;

determining at a signal transfer point network element a count of initial address messages from the originating point code to a destination point code for the measurement interval;

determining at the signal transfer point a count of initial address messages from a calling number to the destination point code for the measurement interval;

determining an average count of initial address messages from the originating point code to the destination point code over N previous measurement intervals; and determining an average count of initial address messages from a calling number to the destination point code over the N previous measurement intervals;

wherein adjusting the rate at which calls originating from the originating point code and the calling number are admitted to the network comprises performing the following operations if the count of no circuit available messages exceeds the no circuit available threshold and if the count of unallocated number messages exceeds the unallocated number threshold:

subtracting the average count of initial address messages from the originating point code to the destination point code over N previous measurement intervals from the count of initial address messages from the originating point code to the destination point code for the measurement interval to obtain a result;

dividing the result by the average count of initial address messages from the originating point code to the destination point code over N previous measurement intervals to obtain a percentage increase in initial address messages from the originating point code to the destination point code;

determining if the result exceeds an originating point code to destination point code count threshold;

determining if the percentage increase in initial address messages from the originating point code to the destination point code exceeds a percentage originating point code to destination point code threshold; and reducing the rate at which calls originating from the originating point code are admitted to the network if the result exceeds the originating point code to destination point code count threshold and the percentage increase in initial address messages from the originating point code to the destination point code exceeds the percentage originating point code to destination point code threshold.

2. The method of claim 1, wherein adjusting the rate at which calls originating from the originating point code and the calling number are admitted to the network further comprises performing the following operations if the count of no circuit available messages exceeds the no circuit available threshold and if the count of unallocated number messages exceeds the unallocated number threshold:

subtracting the average count of initial address messages from the calling number to the destination point code over N previous measurement intervals from the count of initial address messages from the calling number to the destination point code for the measurement interval to obtain a result;

dividing the result by the average count of initial address messages from the calling number to the destination point code over N previous measurement intervals to obtain a percentage increase in initial address messages from the calling number to the destination point code;

determining if the result exceeds a calling number to destination point code count threshold;

determining if the percentage increase in initial address messages from the calling number to the destination point code exceeds a percentage calling number to destination point code threshold; and reducing the rate at which calls originating from the calling number are admitted to the network if the result exceeds the calling number to destination point code count threshold and the percentage increase in initial address messages from the calling number to the destination point code exceeds the percentage calling number to destination point code threshold.

3. The method of claim 1, wherein adjusting a rate at which calls originating from the originating point code and the calling number are admitted to the network comprises:

adjusting a minimum time that elapses between successive calls originating from the originating point code and the calling number and are admitted to the network.

4. The method of claim 1, further comprising:

regulating a volume of incoming calls from the originating originating point code and calling number by only accepting calls within a constrained range of circuit identification codes.

5. The method of claim 1, further comprising:

identifying a destination point code of an end office switch; and providing call admission control targeted to an increase in traffic intended for the end office switch.

6. The method of claim 5, wherein identifying the destination point code of the end office switch comprises:

inspecting a called number field in an initial address message to relate the end off switch destination point code to at least portions of telephone numbers served by the end office switch.

7. The method of claim 6, wherein inspecting the called number field comprises:

using a learning function to assemble a table of relations between switch destination point codes and corresponding telephone numbers.

8. The method of claim 7, wherein using the learning function further comprises:

using the learning function to assemble a table of maximum circuit identification code size for each relation between a tandem switch point code and a corresponding tandem served end office point code based on initial address messages transmitted by the tandem switch; and updating the table with a new maximum circuit identification code value if the circuit identification code number exceeds a previously stored maximum circuit identification code value.

9. The method of claim 8, further comprising:

selecting a choke size for call admission control at the tandem switch based on the maximum circuit identification code value.

10. A call processing system, comprising:

a signal transfer point network element that is configured to associate call release messages, which are indicative of call failures in the communication network, with an originating point code and a calling number and to adjust a rate at which calls originating from the originating point code and the calling number are admitted to the network based on associations between the call release messages and the originating point code and the calling number wherein the call release messages comprise no circuit available messages and unallocated number messages;

wherein the signal transfer point is configured to associate the call release messages by:

determining a count of no circuit available messages during a measurement interval;

determining a count of unallocated number messages during the measurement interval;

determining if the count of no circuit available messages exceeds a no circuit available threshold;

determining if the count of unallocated number messages exceeds an unallocated number threshold;

determining at a signal transfer point network element a count of initial address messages from the originating point code to a destination point code for the measurement interval;

determining at the signal transfer point a count of initial address messages from a calling number to the destination point code for the measurement interval;

determining an average count of initial address messages from the originating point code to the destination point code over N previous measurement intervals; and determining an average count of initial address messages from a calling number to the destination point code over the N previous measurement intervals;

wherein the signal transfer point is configured to adjust the rate at which calls originating from the originating point code and the calling number are admitted to the network by performing the following operations if the count of no circuit available messages exceeds the no circuit available threshold and if the count of unallocated number messages exceeds the unallocated number threshold:

subtracting the average count of initial address messages from the originating point code to the destination point code over N previous measurement intervals from the count of initial address messages from the originating point code to the DPC for the measurement interval to obtain a result;

dividing the result by the average count of initial address messages from the originating point code to the destination point code over N previous measurement intervals to obtain a percentage increase in initial address messages from the originating point code to the destination point code;

determining if the result exceeds an originating point code to destination point code count threshold;

determining if the percentage increase in initial address messages from the originating point code to the destination point code exceeds a percentage originating point code to destination point code threshold; and reducing the rate at which calls originating from the originating point code are admitted to the network if the result exceeds the originating point code to DPC count threshold and the percentage increase in initial address messages from the originating point code to the destination point code exceeds the percentage originating point code to destination point code threshold.

11. A computer program product for operating a communication network that includes a signaling system seven network, comprising:

a non-transitory computer readable storage medium having computer readable program code embodied therein, the computer readable program code comprising:

computer readable program code configured to associate call release messages, which are indicative of call failures in the communication network, with an originating point code and a calling number; and computer readable program code configured to adjust a rate at which calls originating from the originating point code and the calling number are admitted to the network based on associations between the call release messages and the originating point code and the calling number;

wherein the call release messages comprise no circuit available messages and unallocated number messages;

wherein the computer readable program code configured to associate the call release messages comprises:

computer readable program code configured to determine a count of no circuit available messages during a measurement interval;

computer readable program code configured to determine a count of unallocated number messages during the measurement interval;

computer readable program code configured to determine if the count of no circuit available messages exceeds a no circuit available threshold;

computer readable program code configured to determine if the count of unallocated number messages exceeds an unallocated number threshold;

computer readable program code configured to determine at a signal transfer point network element a count of initial address messages from the originating point code to a destination point code for the measurement interval;

computer readable program code configured to determine at the signal transfer point a count of initial address messages from a calling number to the destination point code for the measurement interval;

computer readable program code configured to determine an average count of initial address messages from the originating point code to the destination point code over N previous measurement intervals; and computer readable program code configured to determine an average count of initial address messages from a calling number to the destination point code over the N previous measurement intervals;

wherein the computer readable program code configured to adjust the rate at which calls originating from the originating point code and the calling number are admitted to the network comprises computer readable program code configured to perform the following operations if the count of no circuit available messages exceeds the no circuit available threshold and if the count of unallocated number messages exceeds the unallocated number threshold:

computer readable program code configured to subtract the average count of initial address messages from the originating point code to the destination point code over N previous measurement intervals from the count of initial address messages from the originating point code to the destination point code for the measurement interval to obtain a result;

computer readable program code configured to divide the result by the average count of initial address messages from the originating point code to the destination point code over N previous measurement intervals to obtain a percentage increase in initial address messages from the originating point code to the destination point code;

computer readable program code configured to determine if the result exceeds an originating point code to destination point code count threshold;

computer readable program code configured to determine if the percentage increase in initial address messages from the originating point code to the destination point code exceeds a percentage originating point code to destination point code threshold; and computer readable program code configured to reduce the rate at which calls originating from the originating point code are admitted to the network if the result exceeds the originating point code to destination point code count threshold and the percentage increase in initial address messages from the originating point code to the destination point code exceeds the percentage originating point code to destination point code threshold.

* * * * *